Aug. 28, 1956  E. LAVERDISSE  2,760,309
GLASS ROLLING MACHINES
Filed May 11, 1954
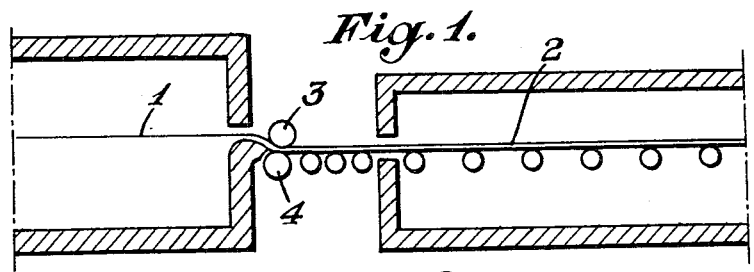
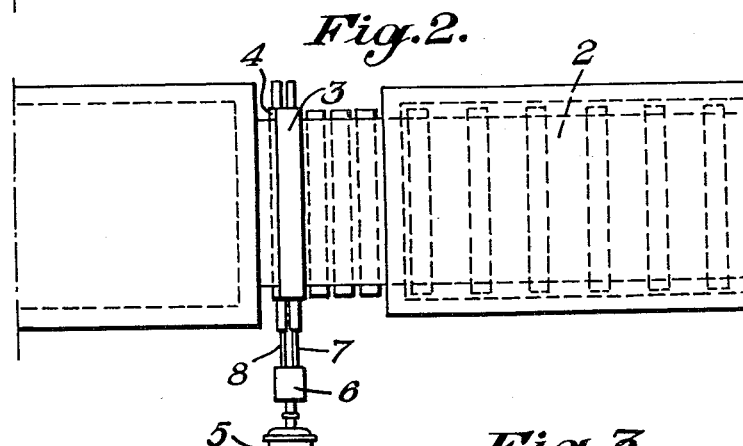
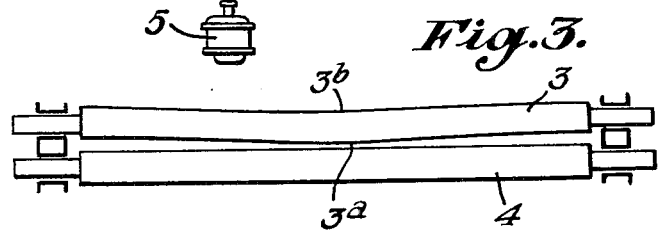
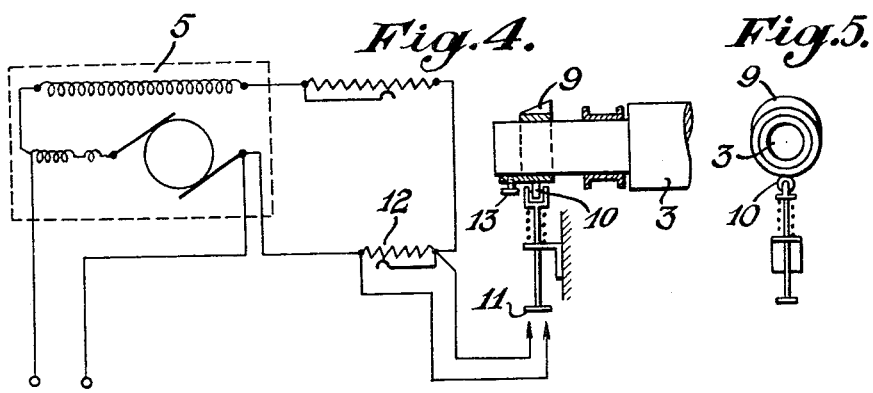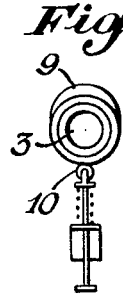

United States Patent Office 2,760,309
Patented Aug. 28, 1956

2,760,309

GLASS ROLLING MACHINES

Edmond Laverdisse, Auvelais, Belgium, assignor to Les Glaceries de la Sambre, Societe Anonyme, Auvelais, Belgium, a Belgian company Application May 11, 1954, Serial No. 429,051

Claims priority, application Belgium May 12, 1953

10 Claims. (Cl. 49—34)

The present invention relates to glass rolling machines comprising at the outlet from a melting tank a pair of rolls between which the molten glass leaving the tank is rolled into a continuous sheet, and has for its object to obviate the deformation of the said rolls under the action of the high temperature of the molten glass and of the radiation of the heat of the tank, which deformation causes irregularities in the thickness of the rolled glass sheet by reason of the fact that the deformed roll becomes arched, a more or less accentuated bulge being formed on the hotter side of the roll.

In accordance with the invention, the bulge of a deformed roll is rectified, that is to say, the roll is straightened, without interrupting the rolling of the glass by varying the relative times of contact of the bulge and of the arched portion of the roll with the hot glass by an appropriate variation of the speed of rotation of the roll in the course of its revolution, so that the bulge of the roll remains in contact with the hot glass for a shorter time than the arch. Thus, the bulge becomes less heated than the arch and the roll is straightened, owing to the differences in the expansion of its opposite sides.

The periodical variation of the speed of the roll to be straightened may be obtained in various ways by acting on the driving mechanism by which it is rotated. If the drive is effected by an electric motor, a simple means consists in periodically inserting in the circuit of the motor, with the aid of a contact controlled by a cam turning with the roll, a resistance for increasing the speed of the motor during the passage of the bulge of the roll over the glass, or conversely in short-circuiting the resistance during the passage of the arch of the roll over the glass in order to reduce the speed of the motor while the bulge of the roll is not in contact with the glass.

The cam turning with the roll is advantageously angularly adjustable to bring the boss thereof into coincidence with the most deformed generatrix of the roll, and axially in relation to the member which it actuates in order to vary the duration of the actuation of the contact by which the speed of the motor driving the roll is varied. It is thus possible to adjust the variation of the speed of the roll as a function of the deformation to be corrected.

In order that the invention may be readily understood, an embodiment thereof will hereinafter be described which is illustrated by way of example in the accompanying drawings, in which:

Figures 1 and 2 show diagrammatically a glass rolling machine, which is seen in longitudinal section in Figure 1 and in plan view in Figure 2.

Figure 3 illustrates diagrammatically, on a larger scale, the rolls of the rolling machine in front elevation, the deformation of the upper roll being greatly exaggerated for the sake of clarity.

Fig. 4 illustrates diagrammatically the circuit of the electric motor driving the rolls, and in longitudinal section the cam controlling the variation of the speed of the motor, and Figure 5 shows the cam in end view.

In Figures 1 and 2 of the drawings, the rolls of the rolling machine, between which the molten glass leaving the melting tank 1 is rolled into a sheet 2, are designated by 3 and 4. An electric motor 5 drives the said rolls through a reduction gear 6 and transmission shafts 7, 8 (Figure 2).

After a certain period of operation, the upper roll 3 of the rolling machine becomes deformed under the action of the heat, as shown on an exaggerated scale in Figure 3, whereby a bulge 3a and an arch 3b are formed.

The bulge of the roll becomes impressed in the glass at each revolution so as to leave a depression therein, and slightly brakes the rotation of the roll, whereby the contact of the bulge with the hot glass is prolonged, the heating thereof is increased and the deformation of the roll is accentuated if the remedy according to the invention is not applied by increasing the speed of the roll when the bulge comes into contact with the glass or by reducing it while the bulge is not in contact with the glass.

For this purpose, in the illustrated example, the journal of the roll bears a cam 9 which actuates through a roller 10 an electric contact 11 adapted to short-circuit a variable resistance 12 inserted in the energising circuit of the motor 5 driving the roll. The area of maximum distortion of the roll can be determined in well known manner by the use of a comparator or depth gage and the cam 9 is accordingly adjusted.

The cam 9 and the contact 11 may be so mounted as to cancel out the short-circuiting of the resistance 12 for the purpose of increasing the speed of the motor 5 when the bulge of the roll comes into contact with the glass, or to short-circuit the resistance for the purpose of reducing the speed of the motor when the arch of the roll comes into contact with the glass.

A button 13 permits of keying the cam 9 in different angular positions on the roll in order to bring the boss thereof into coincidence with the more highly deformed generatrix of the roll.

On the other hand, the cam has a triangular profile so that it is possible by changing the relative axial positions of the cam 9 and of the roller 10 to adjust the duration of actuation of the cam 11 and thus the duration of the increase or of the reduction of the speed of the motor as a function of the deformation of the roll to be straightened.

Naturally, the invention is not limited to the example described and other means may be employed to vary the speed of the roll in the course of its revolution.

I claim:

1. Method of straightening, during the rolling of a sheet of glass, a roll of a glass rolling machine which assumes a determinable arched condition under the action of the heat comprising varying the relative times of contact of the bulge and of the arch of the roll with the hot glass by an appropriate variation of the speed of rotation of the roll in the course of each revolution thereof so that the bulge of the roll remains in contact with the hot glass for a shorter time than the arch.

2. Method according to claim 1 in which the variation of the speed rotation of the roll comprises increasing the speed of a motor driving the roll during the time when the bulge of the roll comes into contact with the hot glass.

3. Method according to claim 1 in which the variation of the speed of rotation of the roll comprises reducing the speed of a motor driving the roll during the time when the arch of the roll comes into contact with the hot glass.

4. Method according to claim 1, characterised in that the duration of the variation of the speed of the roll is adjusted as a function of the degree of deformation of the roll.

5. Device for straightening a roll of a glass rolling machine, which is driven by a motor, comprising a cam turning with the roll and a means actuated by the said cam for the purpose of varying the speed of the motor as a function of the position of the bulge of the roll in relation to the glass in the course of the revolution of the roll.

6. Device according to claim 5, characterised in that the position of the cam is angularly adjustable for the purpose of bringing the boss thereof into coincidence with a particular generatrix of the roll.

7. Device according to claim 5, characterised in that the relative positions of the cam and of the means which it actuates are adjustable axially for the purpose of varying the duration of actuation of the means for varying the speed of the motor.

8. Device according to claim 5, characterised in that the means for varying the speed of the motor comprises a resistance inserted in the circuit of the motor and short-circuited by a contact actuated by the cam.

9. A method of controlling the shape of a roll of a glass rolling machine comprising determining the position of the maximum arch of the roll, angularly positioning a cam which is coaxial with the roll in accordance with the maximum arch of the roll and axially adjusting the position of the cam so that it controls for a determinable time the speed of rotation of the roll and the time during which the arched portion contacts the hot glass.

10. Apparatus for controlling the shape of a roll in a glass rolling machine wherein the roll assumes a determinable arch when in contact with hot glass comprising a cam coaxial with the roll and being angularly positioned with respect to the roll in accordance with the arch, said cam having an angular cross-section and being axially adjustable, a motor for driving the roll and said cam, and control means fixed with respect to said cam for controlling the speed of the motor, the axial adjustment of said cam determining the period during which said control means controls the speed of the motor whereby the duration of contact between the arch and hot glass is minimized.

References Cited in the file of this patent

UNITED STATES PATENTS

| | | |
|---|---|---|
| 1,605,051 | Menzies | Nov. 2, 1926 |
| 1,705,672 | Menzies | Mar. 19, 1929 |
| 1,728,633 | Schmidt | Sept. 17, 1929 |
| 2,627,593 | Tietig | Feb. 3, 1953 |
| 2,691,851 | Davison et al. | Oct. 19, 1954 |